United States Patent [19]

Schoonmaker

[11] 4,074,535

[45] Feb. 21, 1978

[54] SELF-CLEANING FIXED DREDGE

[76] Inventor: Townsend L. Schoonmaker, 265 Summit Ave., San Rafael, Calif. 94901

[21] Appl. No.: 427,077

[22] Filed: Dec. 21, 1973

[51] Int. Cl.² .............................................. E02B 3/02
[52] U.S. Cl. ............................................ 61/2; 37/58; 37/61
[58] Field of Search ......................... 37/58, 61, 62, 63; 61/1 R, 2

[56] References Cited

U.S. PATENT DOCUMENTS

| | | | |
|---|---|---|---|
| 510,713 | 12/1893 | Scott | 61/2 |
| 967,797 | 8/1910 | Lovett | 37/62 |
| 1,388,040 | 8/1921 | Hood | 61/2 |
| 2,442,358 | 6/1948 | Harp | 61/2 |
| 3,013,395 | 12/1961 | Gaylord | 61/2 |
| 3,638,432 | 2/1972 | Schoonmaker | 61/2 |

Primary Examiner—Paul R. Gilliam
Assistant Examiner—David H. Corbin
Attorney, Agent, or Firm—Limbach, Limbach & Sutton

[57] ABSTRACT

A generally horizontal, perforated pipe extends across the bottom of a waterway to be dredged and, in some embodiments, is connected to a suction pump above the water level. The perforations in the horizontal pipe are cleaned of debris by a plurality of horizontal nozzles supplied with water under high pressure which direct high velocity water streams across each perforation to mix with sand along the bottom of the waterway and thereby abrade any obstructions which have settled over the perforations.

2 Claims, 7 Drawing Figures

SELF-CLEANING FIXED DREDGE

BACKGROUND OF THE INVENTION

The present invention relates to a stationary dredging apparatus for automatically removing sand and silt from waterways and more particularly to self-cleaning stationary dredging apparatus.

In U.S. Pat. No. 3,638,432 which issued to the present applicant, a stationary dredge is disclosed in which a generally horizontal pipe is laid on the bottom of the waterway which is connected to the suction line of a pump. The horizontal line is provided with a plurality of perforations into which sand and silt are drawn by the suction of the pump. Clear water, that is water that is clear of sand and silt, is supplied to the horizontal line near the perforations closest to the connection to the pump to dilute the slurry passing through the perforated pipe and thereby reduce clogging. One disadvantage of this system is that when used in areas having high kelp growth or where a large amount of non-granular debris such as cans, bottles or water-logged driftwood, for example, have settled on the bottom, these non-granular debris are drawn by suction over the perforations, thereby clogging them. This same disadvantage also pertains to other types of silt removing, perforated lines which rest on the bottom of a waterway.

SUMMARY OF THE INVENTION

The above and other disadvantages are overcome by the present invention of a self-cleaning, stationary line for removing sand and silt comprising a generally horizontal pipe located near the bottom of a waterway to be dredged, the horizontal pipe being provided with a plurality of orifices. Means are provided for causing water to flow through the pipe so as to create a suction at the orifices which draws a water-slurry mixture into the pipe through the orifices. The orifices are cleared of debris by high velocity water jets from a plurality of nozzles, each nozzle being directed across a separate one of the orifices of the horizontal pipe. Groups of selected nozzles at spaced intervals along the horizontal pipe are separately connected by pipes to a source of high pressure fluid. The high velocity jets of water mix with the bottom sand to degrade any solid matter which tends to block the orifices.

In the preferred embodiment of the invention, the groups of nozzles are connected by separate pipes to a high pressure pump. The purpose of connecting the nozzles, in groups, at spaced locations, and by separate pipes is so that in the event that one group of nozzles or supply pipes becomes blocked and ineffective the horizontal, stationary pipe will still be cleared at other points in the same general location and will not become completely clogged at one area along its length. Any such malfunction is thus distributed evenly along the length of the stationary pipe. This feature allows for a certain amount of temporary compensation of the problem by simply increasing the amount of suction applied to the stationary pipe by the pump. Without this feature the increased suction would not alleviate the problem and the blocked portion of the pipe would be buried deeper and deeper as time passed. In one preferred embodiment, the nozzle orifice is approximately ⅜ inch in diameter and jets a fluid stream at a velocity of approximately 200 feet per second.

This invention is suitable for uses other than in the suction dredging system described in U.S. Pat. No. 3,638,432, referred to above. In these other embodiments, for example, the horizontal pipe is not connected to a suction pump but instead is passed thouugh the foundation of a dam. The water enters the orifices in the horizontal pipe and is vented at the downstream face of the dam through the horizontal pipe. A plurality of jets are directed across each of the orifices and connected through separate pipes to the outlet of a high pressure pump in order to keep the orifices clear.

It is therefore an object of the present invention to provide a stationary dredging apparatus which is self-clearing.

It is still another object of the invention to provide a stationary dredging apparatus wherein means are provided for abrading solid objects which tend to clog the apparatus.

It is still another object of the invention to provide a self-cleaning stationary dredging apparatus which is designed, in case of malfunction, to remain at least partially operative along its entire length.

The foregoing and other objectives, features and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
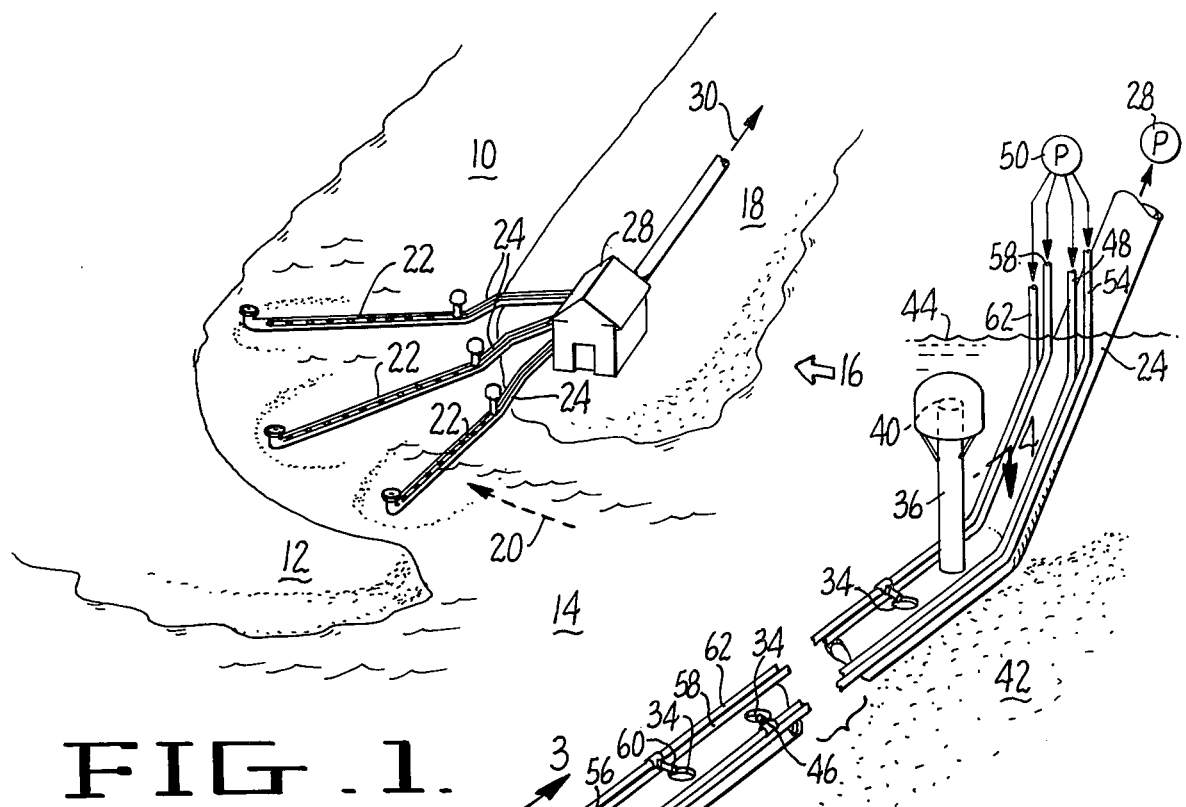
FIG. 1 is a perspective view of a waterway which is protected by a stationary dredging apparatus of this invention.

Referring now more particularly to FIG. 1, a waterway 10 extends through the beach 12 to an ocean 14 providing a channel for cooling water to a hydro-electric plant, for example. An on-shore current, indicated by arrow 16, provides a hazard for beach erosion which is prevented by a breakwater 18 protecting the mouth of the waterway 10. While the breakwater protects the mouth of the waterway from erosion, it produces a current indicated by arrow 20 which tends to deposit sand in the quiet water behind the breakwater 18, necessitating periodic dredging of the mouth of the waterway for adequate water flow through the waterway during low tide.

The stationary dredging apparatus of the invention is installed to remove sand deposits at the mouth of the waterway 10 by periodically or continuously drawing sand and water into one or more underwater, perforated pipes 22 which are separately connected through pipes 24 to the suction side of an above water dredging pump 28 (shown as installed in a pump house). The discharge of the pump extends in the direction of the arrow 30 along the breakwater 18, for example.

Figure 2:
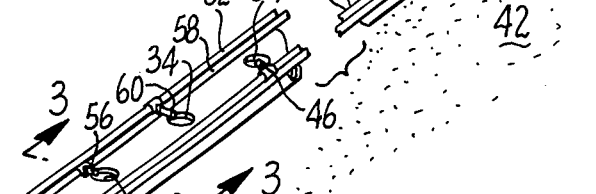
FIG. 2 is an enlarged perspective view of a dredging apparatus according to one embodiment of the invention.
Figure 3:
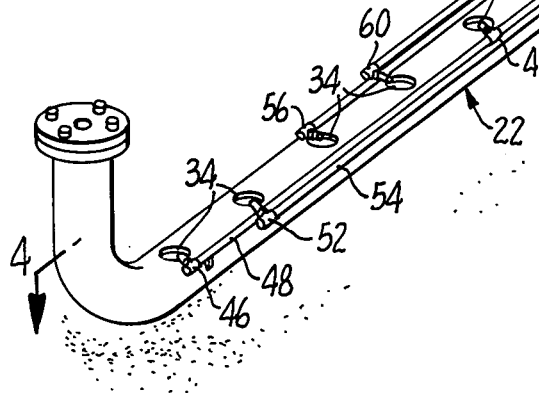
FIG. 3 is an enlarged end view, in section, taken generally along the lines 3—3 of FIG. 2.
Figure 3:
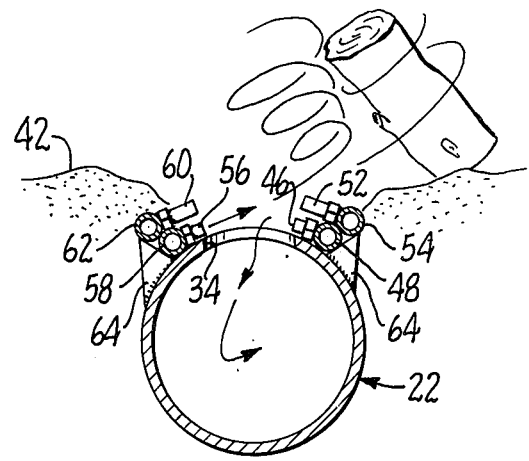
Figure 4:
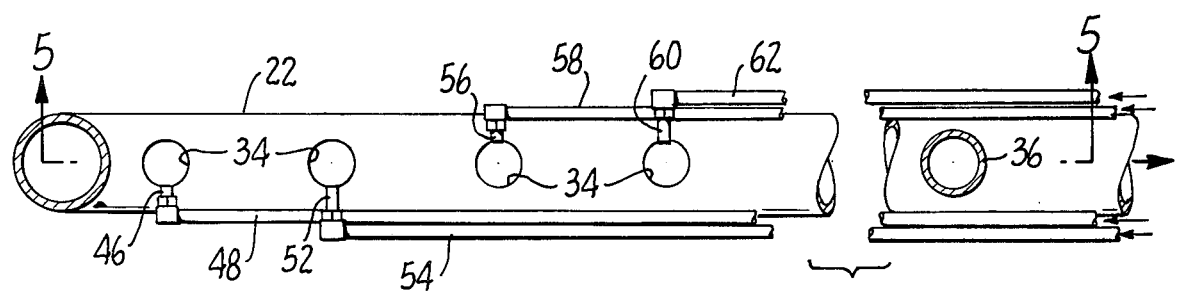
FIG. 4 is an enlarged top view, in section, taken generally along the lines 4—4 of FIG. 2.
Figure 5:
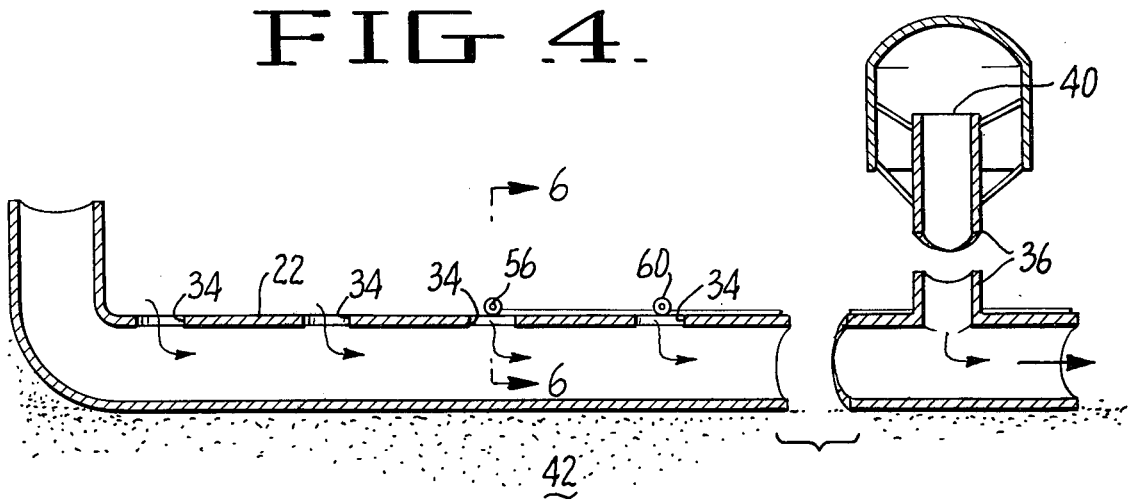
FIG. 5 is an enlarged side view, in section, taken generally along the lines 5—5 of FIG. 4.

As best shown in FIG. 2, a plurality of orifices 34 are provided in the upper side of the pipe 22. A clear water supply to prevent clogging is provided to the pipe by means of a vertical conduit 36 having an intake opening 40 at its top which is located above the normal bottom 42 of the waterway but below the water level 44. In a preferred form of the invention, the apparatus illustrated in FIGS. 2 and 3 is connected with a suction dredging pump 28 (shown in a pump house) having a capacity of 15,000 gallons per minute at a rated input suction of 24 inches of mercury and an output pressure of one hundred and seventy-seven feet of water, for example. The pump is driven by an electric motor (not shown) having a rated horsepower of about 1500. The pipes 22 and 24 are twenty inches in diameter. The pipe 36 and the opening 40 are fourteen inches in diameter and the orifices 34 are ten inches in diameter spaced at 36 inch centers along the horizontal pipe 22.

As best shown in FIGS. 2 and 3, the first, fifth and ninth orifices (and every fourth orifice thereafter), counting from left to right as viewed in FIG. 2, are provided with transverse, high pressure water jets from nozzles 46 directed horizontally across the orifices. The nozzles 46 are connected to a common pipe 48 which is supplied with water under pressure from a pump 50 (shown diagrammatically). Similarly, every second and sixth orifices (and every fourth orifice thereafter) are provided with transverse, high pressure water jets from horizontal nozzles 52 connected by a common pipe 54 to the pump 50. The third and seventh orifices (and every fourth one thereafter) are provided with transverse, high pressure water jets from horizontal nozzles 56 which are connected by a common pipe 58 to the pump 50. Every fourth and eighth orifices (and every fourth one thereafter) are provided with transverse, high pressure water jets from horizontal nozzles 60 connected by a common pipe 62 to the pump 50.

As is more clearly shown in FIG. 2, the groups of nozzles 46 and 52 are directed from right to left across the orifices 34, as viewed in FIG. 2 whereas the nozzles 56 and 60 are pointed in the opposite direction across the orifices 34. This arrangement produces a balanced pattern of clearing water jets which either blow debris away from the orifices 34, or, together with the sand stirred up by the water jets, abrade debris such as tin cans, bottles, and kelp. The nozzles are pointed, however, so as not to impinge upon the pipe 22. The water jets are thus clear of the orifices 34 and do not abrade the pipe 22. Should one or more of the connecting pipes 48, 54, 58 or 62 or the nozzles to which they are connected become clogged or inoperative, the remaining orifices along the stationary pipe 22 will continue to be cleaned by the remaining nozzles so that the stationary dredge will continue to be at least partially operative throughout the entire length of the stationary pipe 22.

As best shown in FIG. 3, the groups of nozzles 46 and 56 are mounted closest to the edge of the orifices 34 whereas the groups of nozzles 60 and 52 are located slightly further away and above the edges of the orifices. In one preferred embodiment, the nozzles 52 and 60 are located three inches back and two inches above the side edge of the orifice. The pipes 48, 54, 58 and 62 are supported on the exterior of the pipe 22 by triangularly shaped brackets 64 welded at spaced intervals along the length of the stationary pipe 22.

Figure 6:
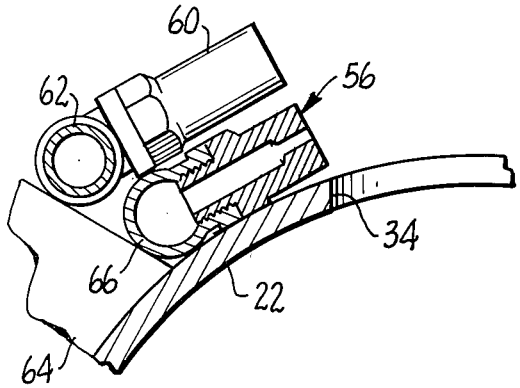
FIG. 6 is an enlarged end view, in section, of a nozzle used in the embodiment of FIG. 1.

A typical nozzle assembly is shown in detail in FIG. 6 as comprising a threaded "T" 66 in the pipe which connects the nozzle to the pump 50. The T and the pipe are preferably made of steel. A nozzle, such as in nozzle group 56, is screwed into the perpendicular leg of the T. The nozzles are preferably made of a hard steel-nickel alloy to resist wearing and corrosion.

Figure 7:
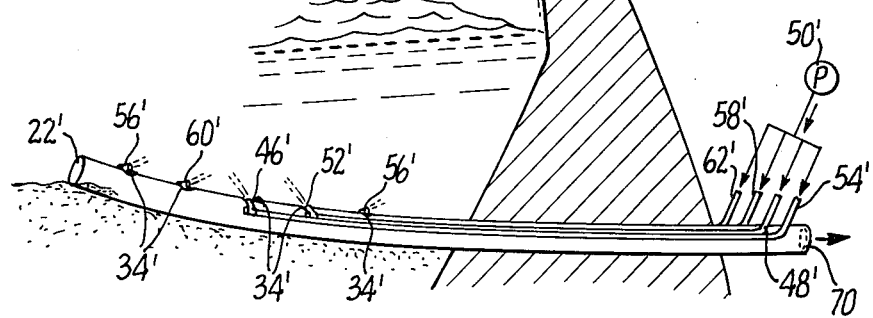
FIG. 7 is a side elevational view, partly in section, of a second embodiment of the invention.

Referring now more particularly to FIG. 7, in another embodiment of the invention, which utilizes the same basic elements (designated by primed reference numerals) as in the embodiment of FIGS. 1-6, inclusive, the horizontal pipe 22' is laid along the bottom of a body of water retained by a dam 68. The pipe 22 extends through the base of the dam to vent through an opening 70 in the pipe on the downstream face of the dam 68. Longitudinally spaced orifices 34' are provided in the top of the pipe 22' to take in water. Separate groups of nozzles 46', 52', 56' and 60', arranged as described above in reference to the embodiment of FIG. 1, are connected in groups by series of pipes 48', 54', 58' and 62', respectively, which may also pass through the dam, to a high pressure pump 50', as described above in reference to the embodiment of FIG. 1. The water jets from these nozzles clear the orifices 34' of debris in the manner aforementioned. In this mode the stationary pipe 22' does not act as a suction dredger, however, silt is carried away by the water exiting through the pipe 22'.

While in the above embodiments the clearing jets have been described as water jets it should be apparent that in other, less advantageous embodiments such nozzles may expel steam or forced air, for example. Thus the term fluid as used herein is not necessarily meant to be limited to a liquid.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An apparatus for removing sediment submerged in water which comprises a stationary conduit submerged under a body of water near the bottom thereof and having lateral passageway means opening into the conduit and distributed along its length with the apparatus arranged to provide fluid streams entering the conduit through the lateral passageway means to carry water and sediment into the conduit, the improvement for tendering the apparatus self-cleaning which comprises a plurality of nozzles mounted in fixed position adjacent to the conduit directed transversely across the fluid streams entering the lateral passageway means, and a source of high pressure fluid connected to the nozzles for directing fluid jets from the nozzles across the fluid stream to remove and abrade objects blocking the stream, the lateral passageway means including a plurality of orifices opening into the stationary conduit which are spaced along its length and further including means for separately connecting the nozzles in selected groups to the source of pressurized fluid, each nozzle being oriented to direct a jet of pressurized fluid laterally across the exterior opening of a separate orifice, but spaced from the separate orifice so as not to impinge upon it, wherein the nozzles are divided into at least two groups on opposite sides of the conduit surface, the nozzles within each group being spaced at predetermined distances along the length of the conduit in alternation with the nozzles of the other groups, and wherein the means for connecting the nozzles to the source of high pressure fluid includes a plurality of pipes, each group being connected to the source of high pressure fluid by a separate pipe.

2. An apparatus for removing sediment submerged in water as recited in claim 1 wherein the source of high pressure fluid is a water pressure pump and the nozzle opening, the diameter of the connecting pipes, and the capacity of the pump are designed to direct a stream of water through each nozzle opening at a rate of at least 200 feet per second.

* * * * *